(12) United States Patent
Soska

(10) Patent No.: US 6,369,353 B1
(45) Date of Patent: Apr. 9, 2002

(54) ROBOTIC LASER TIRE MOLD CLEANING SYSTEM AND METHOD OF USE

(75) Inventor: Geary Victor Soska, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/555,656
(22) PCT Filed: Feb. 20, 1998
(86) PCT No.: PCT/US98/03401
  § 371 Date: Jun. 1, 2000
  § 102(e) Date: Jun. 1, 2000
(87) PCT Pub. No.: WO99/42228
  PCT Pub. Date: Aug. 26, 1999
(51) Int. Cl.[7] .......................... B08B 7/00; B29C 33/72; B23K 26/36
(52) U.S. Cl. .............................. 219/121.68; 219/121.69
(58) Field of Search .................. 219/121.6, 121.68, 219/121.69, 121.76, 121.78, 121.85

(56) References Cited

U.S. PATENT DOCUMENTS

| | | |
|---|---|---|
| 3,905,155 A | 9/1975 | Smith et al. |
| 3,990,906 A | 11/1976 | Johnston et al. |
| 4,803,021 A | 2/1989 | Werth et al. |
| 4,898,650 A | 2/1990 | Wu et al. |
| 5,023,426 A | 6/1991 | Prokosch et al. |
| 5,151,134 A | 9/1992 | Boquillon et al. |
| 5,373,140 A | 12/1994 | Nagy et al. |
| 5,529,636 A | 6/1996 | Nohara et al. |
| 5,531,857 A | 7/1996 | Englesberg et al. |
| 5,580,471 A | * 12/1996 | Fukumoto et al. ..... 219/121.63 |

FOREIGN PATENT DOCUMENTS

| | | |
|---|---|---|
| DE | 44 13 218 | 10/1995 |
| DE | 195 17 218 | 7/1996 |
| EP | 0792731 | 9/1997 |
| GB | 269721 | 4/1927 |
| WO | WO93/19888 | 10/1993 |
| WO | WO94/21418 | 9/1994 |
| WO | WO95/35575 | 12/1995 |

* cited by examiner

Primary Examiner—Samuel M. Heinrich
(74) Attorney, Agent, or Firm—Howard M. Cohn

(57) ABSTRACT

A cleaning device (10) for removing residual material from a mold (12) having a molding surface (13) includes a robot (14) including an arm (16) movable in a plurality of degrees of freedom, the arm having a free end. A laser (18) is connected with the robot (14) and has an output end mounted to the arm (16) proximal to the free end so as to be positionable by the robot. An optical delivery system (38) includes a plurality of optical fibers, each fiber having a first end connected with the laser (18) and a second, output end attached to the free end of the arm of the robot (14). The output ends of the optical fibers (42) are aligned such that the laser forms a stripe of light (18b) on the molding surface (13). A controller (46) is connected with the robot (14) and is configured to direct the robotic arm (16) through at least one predetermined set of movements. A rotatable support (48, 54) is disposed proximal to the robot (14) the mold (12) being disposed on the support. The robot (14) positions the output end of the laser (18) with respect to the molding surface (13) to direct light (18a) from the laser to impinge on the surface and remove residual material from the surface as rotation of the support (48, 54) aligns different sections of the molding surface with the output end of the laser.

8 Claims, 4 Drawing Sheets

ROBOTIC LASER TIRE MOLD CLEANING SYSTEM AND METHOD OF USE

TECHNICAL FIELD

The present invention relates to devices and methods for cleaning tire molds, particularly to methods and apparatuses for cleaning tire molds using a laser mounted onto a robot control apparatus.

BACKGROUND OF THE INVENTION

Presently, two-piece tire molds and segmented tire molds are typically cleaned in semi-automatic machines which use metal shot, plastic beads, or glass beads as the cleaning or blasting agent. All of these blasting agents are abrasive and cause rapid wear to tire mold lettering and sidewall designs.

Another problem encountered by the past cleaning machines was recovery of the blasting agent, such as the sand or glass beads. After the blasting agent had been used to clean a tire mold, it had to be recovered or removed. The recovery of the blasting agent increased the time necessary to clean tire molds and caused a housekeeping problem in the plant.

One such abrasive tire blasting apparatus is found in U.S. Pat. No. 3,905,155 to Smith et al., which discloses a machine that provides a removable hood for positioning over a tire mold and a mechanism to blast the tire mold with abrasive glass beads.

Additionally, as disclosed in international Application Serial No. PCT/US96/13521, filed on Aug. 22, 1996 and having a common assignee with the present invention, a solid $CO_2$ blasting media, which is not abrasive, is used to clean two piece and segmented tire molds. While the process has proved to be successful, there is a high noise level generated in carrying out the process.

Other than blasting, the prior art teaches using concentrated heating sources to loosen material for easier removal from a mold. An example is presented in the British Patent No. GB 269,721 to Stephenson, et al, which discloses a multi-jet arrangement for oxyacetylene blowpipe flames. As seen in their FIG. 1 and FIG. 2, the blowpipes are disposed along the cross section of the mold "so that a much larger area can be treated simultaneously" as the mold is rotated past the blowpipes. Thus, as the mold is rotated, each blowpipe traverses a different annular portion of the mold surface. The apparatus includes subsequent brushing with metal wire brushes to assist in removing the material loosened by the heating flames.

Recently, laser systems have been used for cleaning surfaces. The laser radiation can produce surface heating which is sufficiently rapid and intense to "blast away" surface contamination without the need for any physical contact means such as brushing. For example, U.S. Pat. No. 5,373,140 to Nagy discloses a system for cleaning molds within presses including a light source such as a laser to clean surfaces within the mold. The light source may be formed as a portable unit moving between different presses or may be in the form of a single laser with a plurality of light paths leading from the laser to individual presses to clean the molds within the presses.

The Nagy patent uses the term "light" to refer generically to the radiation emitted from a laser. In keeping with this practice, the terms "radiation" and "light" will be considered interchangeable in reference to laser emissions throughout the present patent document.

Another method for cleaning molds with a laser is disclosed in German Patent No. DE 195 17 218, which states, for example, a process and apparatus comprises a conventional portable laser device with a working head which is driven on the heating press to be cleaned via a pivoting manipulator, or hinge-jointed beam arm, provided with mirrors for transmitting laser pulses to the laser working head. The laser working head can be under computer control, and a suction system used to collect the laser-removed dirt.

A device for contactless removal of a film from a structural part and for cleaning a surface by means of a pulsed laser beam, disclosed in German Patent No. DE 44 13 218, comprises a TEA-$CO_2$ laser as the laser radiation source where the laser beam is guided by reflecting and focusing optic devices through a flexible opto-mechanical hinge-jointed arm which is hinge jointed to the working head and to the laser radiation source. An adaptive optical system in the arm or working head can include curved mirrors and/or a lens.

Another method for cleaning a surface with a laser, as disclosed in U.S. Pat. No. 5,151,134, states for example "an optical system is provided to separate the laser beam into a plurality of individual laser beams with energies approximately equal to each other and guided by an optical fiber assembly together with a recombining of the individual beams into a single laser beam." The recombined output beam is generally circular with a diameter controlled by an afocal optical assembly. Yet another apparatus for cleaning surfaces with a laser is disclosed in U.S. Pat. No. 5,531,857 to Englesburg et al wherein, for example, "Gas is flowed across the substrate treatment surface and the substrate is continuously irradiated . . . to release surface contaminants from the substrate treatment surface . . . ."

Applicants recognized a need for a method and apparatus for cleaning tire molds with a laser that was quick, efficient, and less noisy than the prior art methods and achieve.

The present invention contemplates a new and improved tire mold cleaning method and apparatus which is simple in design, effective in use, and overcomes the foregoing difficulties and others while providing better and more advantageous overall results.

OBJECTS AND SUMMARY OF THE INVENTION

It is an object of the present invention to provide a robotic laser tire mold cleaning system (device) and method of operating the system, the system as defined in one or more of the appended claims and, as such, having the capability of being constructed to accomplish one or more of the following subsidiary objects.

It is another object of the present invention to provide a new and improved robotic laser tire mold cleaning system and method of use for cleaning a mold, particularly a tire mold.

It is yet another object of the present invention to provide a new and improved robotic laser tire mold cleaning system and method of use for cleaning a mold which uses a laser mounted on a robot to clean a tire mold.

It is still another object of the present invention to provide a new and improved robotic laser there mold cleaning system and method of use for cleaning a mold which uses a robot mounted laser to clean a tire mold while the latter mold is being rotated.

According to a first aspect, the present invention is a cleaning device for removing residual material from a mold having a molding surface. The device comprises a robot including an arm movable in a plurality of degrees of freedom, the arm having a free end. A laser is connected with the robot and has an output end mounted to the arm proximal to the free end so as to be positionable by the robot. The robot positions the output end of the laser with respect to the molding surface to direct light from the laser to impinge on the surface and remove residual material from the surface.

According to another aspect, the present invention is a method of cleaning residual material from the molding surface of a mold comprising the following steps: providing a robot having an arm movable in a plurality of degrees of freedom and a laser connected with the robot and having an output end mounted to the arm; automatically moving the arm to align the output end of the laser with the molding surface; and activating the laser such that laser light impinges on the molding surface and removes residual material disposed on the surface.

In yet another aspect, the present invention is a system for cleaning a metallic object. The system comprises a robot including an arm movable in a plurality of degrees of freedom, the arm having a free end. A laser is connected with the robot and has an output end mounted to the arm proximal to the free end so as to be positionable by the robot. A rotatable support is disposed proximal to the robot and is configured to support the object and rotate the object with respect to the output end of the laser.

One advantage of the present invention is that the cleaning apparatus is completely automatic.

Another advantage of the present invention is that the beam of laser light is non-abrasive and does not damage the tire mold.

Another advantage of the present invention is that the laser light provides single pass cleaning of the tire mold as opposed to multiple passes required by existing systems.

Another advantage of the present invention is that the laser light also cleans the tire molds without generating a loud noise level.

Still other benefits and advantages of the invention will become apparent to those skilled in the art to which it pertains upon a reading and understanding of the following detailed specification.

BRIEF DESCRIPTION OF THE DRAWINGS

The foregoing summary, as well as the detailed description of the preferred embodiments of the invention, will be better understood when read in conjunction with the appended drawings. For the purpose of illustrating the invention, there is shown in the drawings, which are diagrammatic, embodiments which are presently preferred. It should be understood, however, that the invention is not limited to the precise arrangements and instrumentalities shown in the drawings wherein.

DETAILED DESCRIPTION OF THE INVENTION

Figure 1:
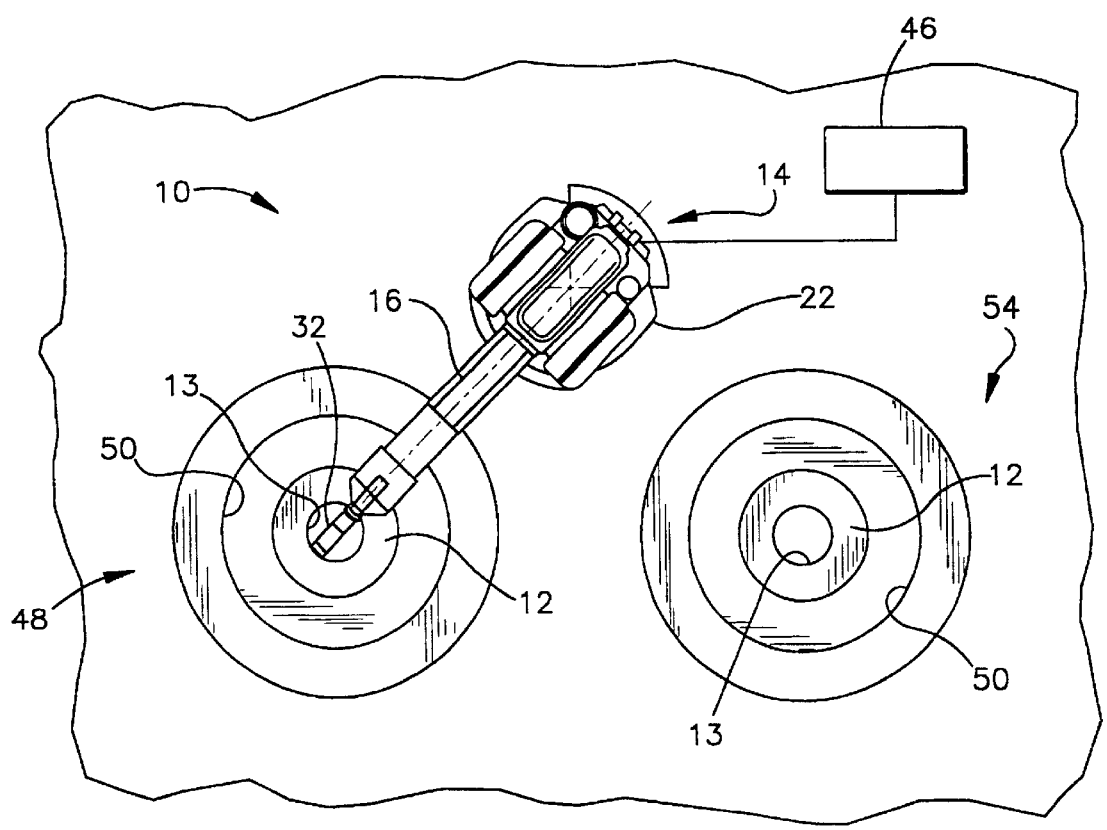
FIG. 1 is a top plan view of the robotic laser cleaning device in accordance with the present invention.

Certain terminology is used in the following description for convenience only and is not limiting. Referring now to the drawing, wherein like numerals are used to indicate like elements throughout, there is shown in FIG. 1 through FIG. 6 (FIGS. 1–6) a presently preferred embodiment of a robotic laser cleaning device 10 for cleaning residual material from the molding surface 13 of a tire mold 12. The cleaning device 10 primarily comprises a robot 14 having an arm 16 movable within a plurality of degrees of freedom and a laser 18 connected with the robot 14 and having an output end 20 attached to the free end of the arm 16 of the robot 14. The robot 14 positions the output end 20 of the laser 18 with respect to the molding surface 13 such that activation of laser 18 directs laser light 18a to impinge on the surface 13 and remove residual material from the surface 13.

Figure 2:
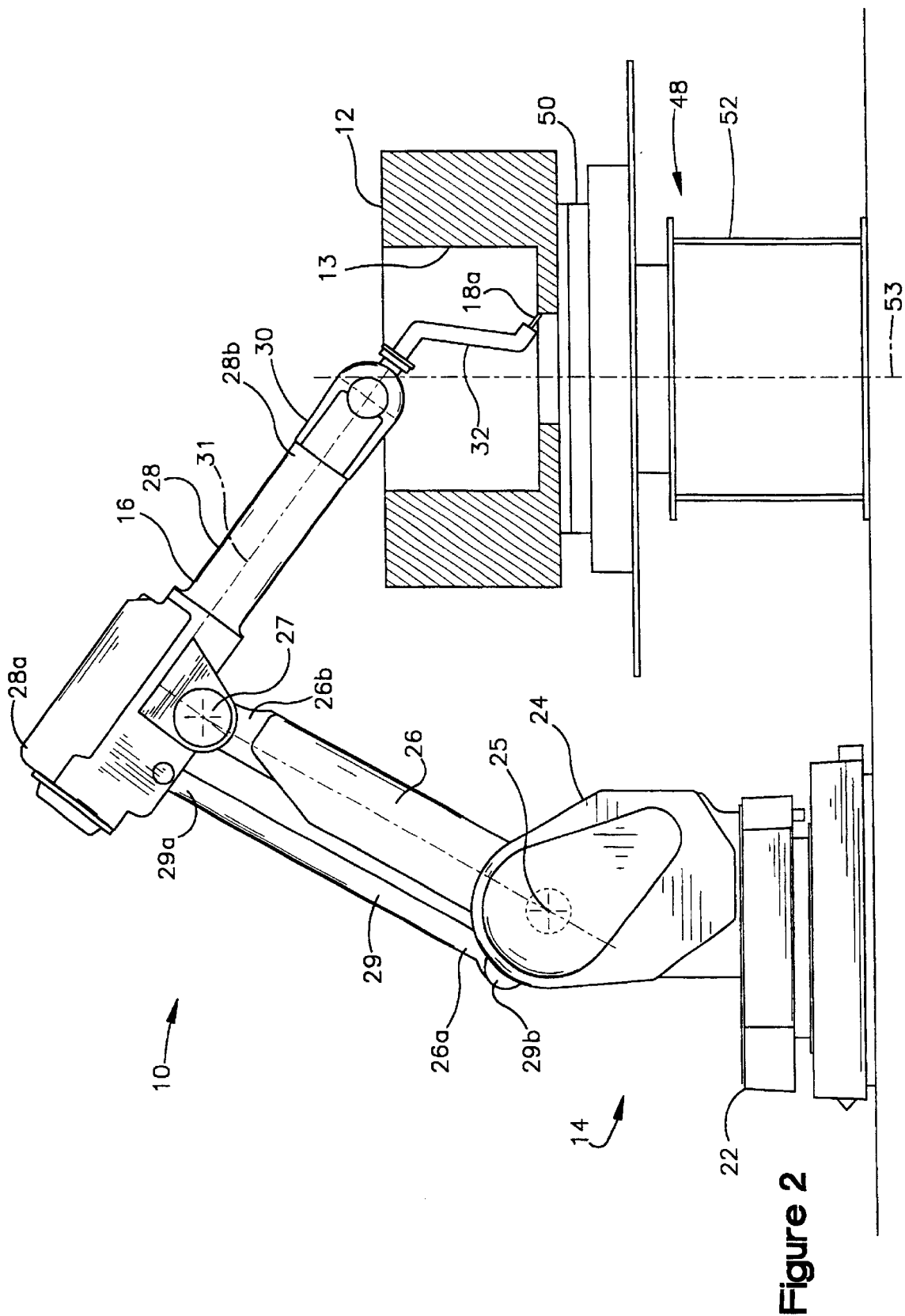
FIG. 2 is a side elevational view of the robot and a tire mold on one rotatable support, shown performing a cleaning operation.

Referring to FIGS. 1 and 2, the robot 14 is preferably a commercially available industrial robot having an arm 16 that is movable within six degrees of freedom ("DOF"). More specifically, the robot 14 preferably includes a base 22 configured to rotate within a horizontal plane (first DOF), to which 32 mounted a "shoulder" 24 of the robotic arm 16. The robotic arm 16 further includes an "upper arm" 26 having a lower end 26a pivotally attached (second DOF) to the shoulder 24 by means of a laterally extending shaft 25. The arm 16 also includes a "forearm" 28 having a first end 28a pivotally attached (third DOF) to the free end 26b of the upper arm 26 by means of a pivot shaft 27. The forearm 28 is pivoted about shaft 27 by movement of actuator arm 29 pivotably connected at end 29a to forearm 28 and at end 29b to shoulder 24. Further, a "wrist" 30 of the arm 16 is attached to the free end 28b of the forearm 28 and is capable of moving in the following three manners: by pivoting about the free end 28b of the forearm 28 (fourth DOF), by "spinning" about an axis 31 extending along the centerline of the forearm 28 (fifth DOF), and by spinning about the axis 31 (sixth DOF).

Furthermore, the robotic arm 16 includes an "end effector" mounted to the wrist 30, which is preferably a laser delivery head 32 as described hereinafter. As is well known in the robotics field of art, an end effector is the working tool that is positionable by movement of the robotic arm 16 within one or more of the degrees of freedom.

Preferably, the robot 14 includes a plurality of electric servomotors (not shown) actuating and controlling the movement of the base 22 and the various portions of the arm 16 described above. However, it is within the scope of the present invention to utilize any other appropriate means for actuating the movements of the components of the robot 14, such as for example, hydraulic or pneumatic motors (neither shown).

Furthermore, although the above-described structure of the robot 14 is preferred, it is within the scope of the present invention to construct the robot 14 in any other manner that enables the robotic laser cleaning device 10 to function as described in detail below. For example, the robot 14 can alternatively have a wrist 30 that is configured to spin, to rotate within a vertical plane, and to rotate in horizontal plane as opposed to spinning along axis 31. Further, the robot 14 may optionally include a machine vision system provided by, for example, video cameras (none shown)

connected to a video processor (not shown), so that the robot 14 can recognize the location of the end effector and adjust its position to ensure that the cleaning device 10 performs as desired during a cleaning operation, as described below.

Preferably, the laser 18 is a standard, solid-state Nd:YAG (i.e., Neodymium doped Yttrium Aluminum Garnet) continuous wave laser, which are well known in the laser field of art. Most preferably, the laser 18 is a commercially available Nd:YAG laser. The laser 18 has sufficient power/intensity such that laser light 18a emitted from the output end 19 of the laser 18 vaporizes residual material in the tire mold 12 upon contact. Although a Nd:YAG laser is preferred, it is within the scope of the present invention for the laser 18 to be a pulsed $CO_2$ laser, a pulsed excimer laser, or any other appropriate type of laser that enables the cleaning device 10 to function as described in the present disclosure. Further, the term "laser" as used in the present disclosure is intended to cover any high-energy irradiation source, including pulsed or continuous wave lasers and high-energy lamps.

Figure 3:
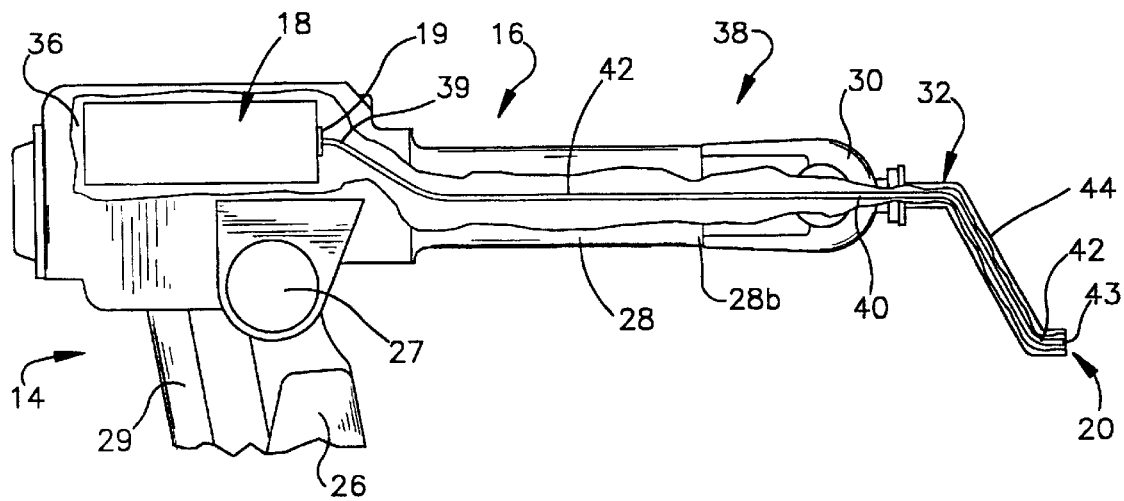
FIG. 3 is an enlarged, partially broken-away side view of the forearm and wrist portions of the robotic arm.

As shown in FIG. 3, the laser 18 is mounted on the robot 14, and is most preferably enclosed within a housing section 36 of the forearm 28 of the robotic arm 16. However, the laser 18 can alternatively be mounted on a separate platform (not shown) located proximal to the robot 14 or can be mounted at any other appropriate location on the robot 14, such as for example, in the base 22. A standard power supply (not shown) connected with the laser 18 provides power to operate the laser 18 and is also preferably mounted on a separate platform (not shown) located proximal to the robot 14.

Further, as best shown in FIG. 3, the laser 18 includes an optical delivery system 38 having a pathway extending between the laser 18 and the terminal end 20 of the delivery head 32. In an embodiment shown in FIG. 3, a first end 39 of optical fibers 42 are connected with the laser 18 and a second end 40 of the optical fibers are mounted to the wrist 30 of the robotic arm 16. Preferably, the delivery system 38 includes a plurality of optical fibers 42 extending from the output port 19 of the laser 18 to the delivery head 32 attached to the wrist 30 at the free end of the robotic arm 16. The end effector of the robot 14, as mentioned above, is actually the combination of the delivery head 32 and the output ends 43 of the optical fibers 42 enclosed within the delivery head 32. The optical fibers 42 are bundled together and disposed within the forearm 28 of the robotic arm 16 so as to extend along the axis 31 of the forearm 28 to the wrist 30 and terminate in the delivery head 32. Preferably, the delivery head 32 is a tubular housing 44 having a first end 44a attached to the wrist 30, through which the optical fibers 42 enter the delivery head 32, and a second or "delivery" end 44b out of which is directed laser light 18a emitted from the output ends 43 of the optical fibers 42. The tubular housing 44 is preferably curved to facilitate placement of laser light 18a onto complex surfaces 13 of the mold 12. Furthermore, a vacuum device or "smoke sucker" (not shown) is preferably mounted to the delivery head 32 so as to evacuate residual material vaporized during a cleaning operation through the tubular housing 44, as described below.

Figure 4:
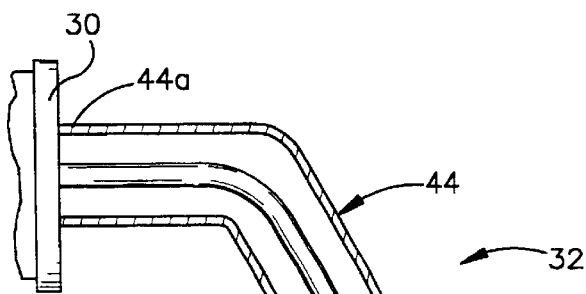
FIG. 4 is a greatly enlarged side cross-sectional view of the laser delivery head.
Figure 4:
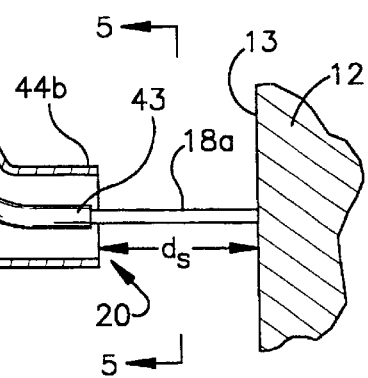
Figure 5:
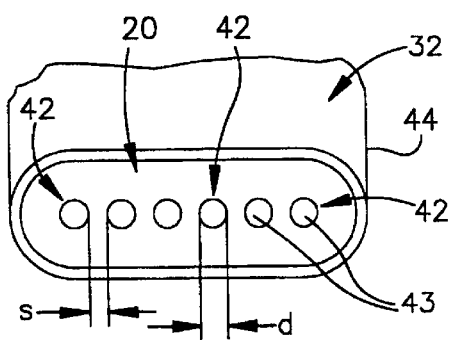
FIG. 5 is a view through line 5—5 of FIG. 4.
Figure 6:
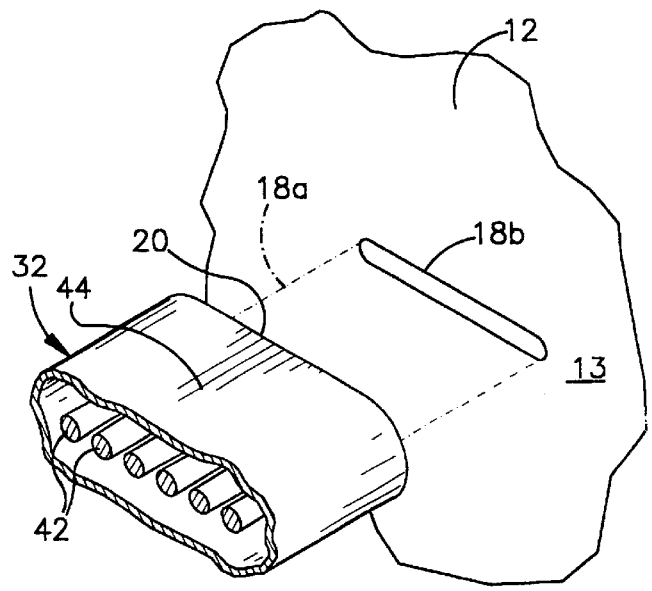
FIG. 6 is an enlarged, broken-away perspective view of the end of the delivery head and a section of the molding surface, showing an exemplary laser radiation stripe.

Referring to FIGS. 4, 5 and 6, the output ends 43 of the optical fibers 42 are aligned such that laser light 18a outputted from the laser 18 forms a stripe of light 18b. Most preferably, the diameter "d" of the optical fibers 42 and the spacing distance "s" between the individual fibers 42 is such that a stripe of light 18b having a length in the range of about 1.92 centimeters (cm) [0.75 inches] to about 3.81 cm [1.5 inches]. The width of the stripe 18b of light is in the range of about 0.25 cm (0.098 inches] to about 1.5 cm [0.394 inches] and is formed on a mold surface 13 from a stand-off distance $d_s$ (i.e., the distance from the output ends of the fibers 42 to the mold surface 13) of about 1.92 cm to about 3.81 cm. The robot 14 is preferably programmed to ensure that the output ends 43 of the fibers 42 are always normal to the section of the molding surface 13 upon which the stripe 18b is projected, so that the light stripe 18b is of a sufficient intensity to ablate residual material, as described further below.

Figure 7:
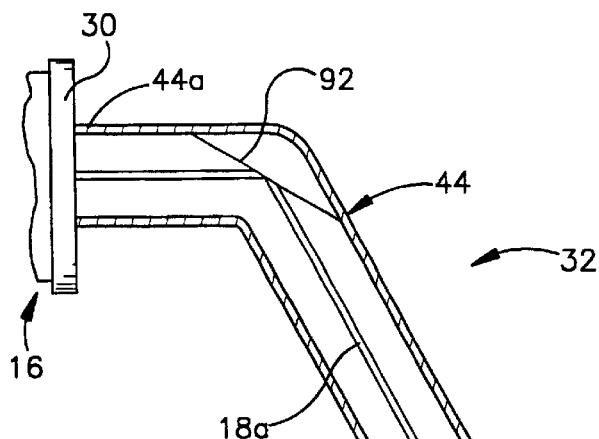
FIG. 7 is a view of an alternate embodiment of the laser delivery head incorporating optical reflectors in accordance with the invention.
Figure 7:
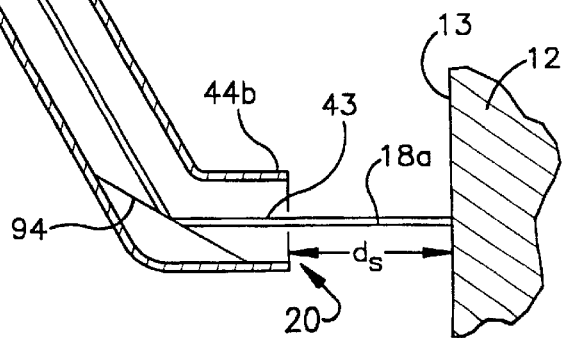

Although a plurality of optical fibers 42 are preferred, the delivery system 38 may alternatively be provided by a series or optical reflectors, such as mirrors 92 and 94 as shown in FIG. 7, mounted on or within the tubular housing 44 of delivery head 32 and configured to direct laser light 18a from the wrist 30 of the robotic arm 16, to which it can be delivered through optical fibers 42, as shown in FIG. 3, and then to a desired target, such as the molding surface 13 of a tire mold 12. Further, it is within the scope of the present invention to utilize any other appropriate system for delivering laser light 18a from the laser 18 to an end effector (i.e., some type of laser delivery head) of the robotic arm 16 and therefrom to a desired target.

Referring to FIGS. 1 and 2, the robotic laser cleaning device 10 further includes a controller 46 for controlling the operation of the robot 14 and for interfacing the robot operation with the laser 18. During a cleaning operation (described below), the controller 46 directs the robotic arm 16 so that the delivery head 32 is moved through at least one predetermined set of movements with respect to the tire mold 12. The predetermined set of movements causes laser light 18a directed from the head 32 to impinge on all sections of the molding surface 13. The controller 46 also controls the activation and deactivation of the laser 18 so that the laser 18 is turned on and off at appropriate times during the cleaning operation. Further, the controller 46 is fully programmable so as to be capable of actuating the robotic arm 16 to move through a plurality of different predetermined sets of movements. Such controller programmability allows the cleaning device 10 to be used with various molds 12 having different sizes and/or shapes. The controller 46 is preferably the standard control system provided with a commercially available robot 14, although the controller 46 can alternatively be a separately provided personal computer, a programmable logic controller ("PLC") or any other such programmable device (none shown) connected with the robot 14 and with the laser 18.

Referring to FIGS. 1 and 2, the robotic laser cleaning device 10 preferably further includes at least one rotatable support 48 configured to both locate the mold 12 in a specific position with respect to the robot 14 and to rotate the mold with respect to the robot 14. The rotatable support 48 preferably includes a rotary table 50 rotatably mounted to a stationary base 52 so as to turn about a vertical axis 53, although another rotatable device such as a cylindrical platform (not shown) may alternatively be used. Further, a centering apparatus (not shown) connected with the rotatable support 48 centers a tire mold 12 placed upon the table 50 about the axis 53 and is preferably provided by three centering guide members (none shown) slidably attached to the table 50 and movable in radial directions. A servomotor (not shown) drives the rotary table 50 and is preferably controlled by the controller 46, although alternatively the servomotor can be controlled by a separate controller (not shown) or by a manually operated switch and speed control (neither shown). The controller 46 regulates the speed at which the servomotor rotates the support 48, and thus a mold 12 on the table 50, and coordinates the rotation of the table 50 with movement of the robotic arm 16, as described further below.

By having a rotatable support 48, the cleaning device 10 is able to operate by using the table 50 to rotate the mold 12 about the delivery head 32, the rotation of the table 50 aligning different circumferential sections of the molding surface 13 with the output ends 43 of the optical fibers 42. Thus, rotation of the table 50 enables the laser stripe 18b to sweep around the entire circumference of the molding surface 13. Without a rotatable support, the robotic arm 16 would be required to rotate the head 32 about the central axis 53 so that the laser stripe 18b reaches all sections of the molding surface 13. Thus, the additional degree of freedom provided by the rotatable support 48 minimizes the amount of twisting and turning required by the robotic arm 16 and thereby reduces the potential for damage to the cleaning device 10, especially to the optical fibers 42. However, although it is less desirable, it is within the scope of the present invention to utilize the cleaning device 10 with a stationary support (not shown) for the mold 12. Further, as shown in FIG. 1, the cleaning device 10 preferably includes a second rotatable support 54 disposed adjacent to the robot 14 such that the two supports 48 and 54 are spaced generally equidistant from the robot 14. With two supports 48, 54, a cleaned mold 12 can be removed from one support 48 or 54 and replaced with another mold 12 to be cleaned while the cleaning device 10 is performing a cleaning operation on a mold 12 disposed on the other support 54 or 48.

In operation, the robotic laser cleaning device 10 is most preferably used to remove residual material remaining in a tire mold 12 after a tire molding operation is performed. Such material includes particles of uncured and cured rubber, bladder release agents, and other foreign materials such as dust, dirt particles, oils or lubricants from associated manufacturing equipment. However, it is within the scope of the present invention to utilize the cleaning device 10 to remove other residual materials from any other type of mold, such as injection molding equipment (not shown), or from any other manufacturing equipment constructed of a material suitable to be cleaned by laser light.

Generally, the cleaning device 10 operates by rotating the table 50 to turn the mold 12 while, simultaneously, the robot 14 positions and repositions the delivery head 32 so that the laser stripe 18b impinges on every section of the molding surface 13 to remove all residual material from the mold 12. More specifically, the first step in using the cleaning device 10 is to place a tire mold 12 one or both rotatable supports 48 and 54, and then center the mold 12 on the rotary table 40 about the axis 53. When the mold 12 is centered about the axis 53, the controller 46 is programmed to "know" the location of the entire molding surface 13 of the mold 12, and can thereby accurately position the robotic arm 16 within the tire mold 12. The controller 46 activates the robot 14 so that the delivery head 32 is placed within the interior of the tire mold 12 at an initial position with respect to the molding surface 13. The controller 46 thereafter activates the laser 18 and rotates the rotary table 50 so that the mold 12 turns about the axis 53, and thus the delivery head 32, at a rotational speed preferably between about 0.5 rotations per minute ("rpm") and about 6.0 rpm. The robotic arm 16 executes a predetermined set of movements such that the delivery head 32 directs the light stripe 18b to impinge on all sections of the molding surface 13. As the light stripe 18b impinges on the molding surface 13, the stripe 18b contacts any residual material thereupon and causes the material to become vaporized. The vaporized material can then be evacuated from the mold 12 by the smoke sucker (not shown). Preferably, the mold 12 is completely cleaned of residual material from one "pass" of the light stripe 18b over the entire molding surface 13. However, the cleaning process can be repeated if necessary, such as if a thick accumulation of residual material is initially present on the molding surface 13.

The cleaning device 10 of the present invention has a number of advantages over prior art mold cleaning systems. For example, by being mounted to a robot 14, the laser cleaning process is fully automated and therefore operator error, due to such factors as fatigue and/or carelessness, is virtually eliminated. Thus, a tire mold 12 cleaned by the device 10 of the present invention is much more likely to be free of residual materials than a mold 12 cleaned using the hand-held laser system disclosed in the 5,373,140 patent to, Nagy. Further, by having the rotatable support 48, 50, wear on the optical fibers that occurs with the Nagy device is not present with the robotic laser cleaning device 10. Further, the cleaning system 10 is quieter than cleaning systems using $CO_2$ pellets. Further, as the laser light 18a cleans the molding surface 13 in a non-abrasive manner, the life of a mold 12 cleaned by the cleaning device 10 of the present invention is treater than with molds repeatedly cleaned by an existing abrasive process such as those involving impact by glass or plastic beads, or metal shot.

It will he appreciated by those skilled in the art that changes could be made to the embodiments described above without departing from the broad inventive concept thereof. It is understood, therefore, that this invention is not limited to the particular embodiments disclosed, but it is intended to cover modifications within the scope of the present invention as defined by the appended claims.

I claim:

1. A cleaning system (10) for removing residual material from a mold (12) having a molding surface (13), the system including a robot (14) including an arm (16) movable in a plurality of degrees of freedom, the arm having a free end (28b), a laser (18) connected with the robot and having an output end (19) mounted to the arm proximal to the free end so as to be positionable by the robot wherein the robot positions a cleaning system output end (20) with respect to the molding surface to direct radiation (18a) from the laser to impinge on the molding surface and remove residual material from the surface, the output end of the laser enclosed in a laser delivery head (32) containing one or more optical fibers (42) to deliver the laser radiation to a delivery end (44b) of the laser delivery head, the cleaning system characterized by:

a plurality of the optical fibers extending from the output end of the laser, through the laser delivery head, to output ends (43) of the fibers located at the delivery end of the laser delivery head; and the output ends of the plurality of optical fibers being aligned and spaced apart such that the laser radiation output from the plurality of optical fibers forms a stripe (18b) of radiation on the molding surface, the system output end (20) disposed to move to the molding surface wherein the direction of movement of the stripe is parallel to the axis of the stripe of radiation.

2. The cleaning system as recited in claim 1 characterized by:

a programmable controller (46) connected to control the robot and configured to direct the arm of the robot through at least one predetermined set of movements.

3. The cleaning system as recited in claim 2 characterized in that:

the controller is configured to interface the laser with the robot.

4. The cleaning system as recited in claim 1 characterized in that:
the laser delivery head is curved so that the laser radiation output can be projected in a direction normal to the molding surfaces to be cleaned using standard motions of the robot.

5. The cleaning system as recited in claim 1 characterized in that:
the laser delivery head further includes a plurality of optical deflectors (92, 94) positioned following the output ends of the plurality of fibers to further direct laser radiation from the plurality of optical fibers to the molding surfaces to be cleaned.

6. The cleaning system as recited in claim 1 characterized in that:
the diameter (d) of each one of the plurality of optical fibers and the spacing distance (s) between adjacent ones of the plurality of optical fibers is such that the stripe of radiation has a length in a range of 1.92 cm to 3.81 cm, and a width in a range of 0.25 cm to 1.5 cm; wherein the stripe of radiation is formed on the mold surface from a stand-off distance ($d_s$) in a range of 1.92 cm to 3.81 cm.

7. A method of cleaning residual material from the molding surface (13) of a mold (12), the method including: providing a laser (18) having a laser delivery head (32) with a delivery end (44b); moving the laser delivery head to align the delivery end of the laser delivery head with the molding surface; activating the laser such that laser radiation (18a) impinges on the molding surface and removes residual material disposed on the molding surface, the method characterized by:
forming the laser radiation impinging on the molding surface into a stripe (18b) of radiation;
moving the stripe of radiation relative to the molding surface in a direction which is parallel to the axis of the stripe of radiation; and
curving the laser delivery head and moving the laser delivery head in a way that maintains a direction for the radiation which is normal to the molding surface.

8. The method as recited in claim 7 including:
providing a robot (14) having an arm (16) movable in a plurality of degrees of freedom;
connecting the laser with the robot; mounting the laser delivery head to the arm; and
automatically moving the arm of the robot to align the delivery end of the laser delivery head with the molding surface;
characterized by:
directing the robot to move the laser delivery head through a set of movements predetermined for each unique mold shape, so that the laser radiation is directed to different sections of the molding surface.

* * * * *